UNITED STATES PATENT OFFICE.

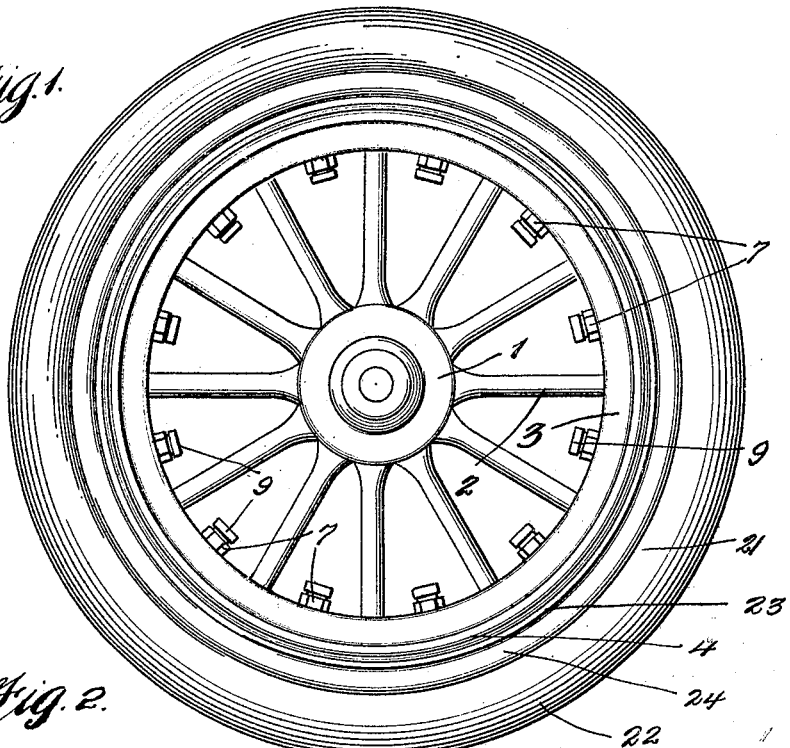

JAMES G. MAXWELL, OF WASHINGTON, PENNSYLVANIA.

TIRE.

942,654.     Specification of Letters Patent.     Patented Dec. 7, 1909.

Application filed November 9, 1908. Serial No. 461,677.

*To all whom it may concern:*

Be it known that I, JAMES G. MAXWELL, a citizen of the United States of America, residing at Washington, in the county of Washington and State of Pennsylvania, have invented certain new and useful Improvements in Tires, of which the following is a specification, reference being had therein to the accompanying drawing.

This invention relates to tires for automobiles and similar vehicles, and the object of my invention is the provision of novel means in connection with a wheel and tire for normally maintaining the tire in an expanded or inflated condition.

My invention aims to obviate the necessity of using inner pneumatic tubes in a tire, and to utilize the external pressure of air for cushioning an outer tire and retarding the act of compressing the tire when irregularities or obstructions are encountered upon a road. To this end, I have devised a tire for automobile wheels, that will increase the roadability of a motor driven machine, prevent skidding, and disabling of the machine due to punctures and penetrations of the tire.

The detail construction entering into my invention will be presently described, and then specifically pointed out in the appended claims.

In the drawings, Figure 1 is a side elevation of a wheel constructed in accordance with my invention, Fig. 2 is a longitudinal sectional view of a portion of a tire constructed in accordance with my invention, Fig. 3 is a cross sectional view of the same, and Fig. 4 is an elevation of a portion of the sectional semi cylindrical shell of the tire.

In the accompanying drawing I have illustrated a wheel comprising a hub 1, spokes 2, a felly 3, and a rim 4. The rim 4 and the felly 3, between the spokes 2 are provided with alining openings 5 for cylinders 6. The ends of each cylinder are exteriorly screw threaded for nuts 7 and 8, these nuts holding the cylinder in engagement with the rim 4 and the felly 3.

Detachably mounted upon the inner end of each cylinder 6 is a cap 9 having a small central port 10. Suitably secured to the cap 9 and extending into the cylinder 6 is a resilient gasket 11, having a central opening 12 alining with the port 10 of the cap 9.

The outer end of the cylinder 6 is provided with a cap 13 having a central opening 14 for a piston rod 15, said rod within the cylinder 6 having a head 16. The outer end of the rod 15 is reduced and exteriorly threaded, as at 17, for holding semi cylindrical sections 18, said section having a central enlargement 19 for the reduced threaded end of the piston rod 15.

The sections 18 are of a sufficient length to adjoin and are overlapped, as at 20 to provide a smooth exterior surface for a tire 21 having a reinforced tread 22. The tire 21 is made of rubber or a similar resilient material and is provided with clencher edges 23 held in engagement with the rim 4 by rings 24.

Interposed between the cap 13 and the central enlargement 19 of each section 18 and encircling the piston rod 15 is a coil spring 25.

In operation, the springs 25 are adapted to force outwardly upon the semi cylindrical sections 18 and maintain the tire 22 in an expanded condition, the sections 18 of the shell being preferably made of metal, whereby the tire cannot be easily punctured, and rendered useless as a supporting means for wheels and the vehicle body carried thereby. When the tire is compressed, the air within the cylinder 6 which slowly escapes through the opening 12 and the port 10, cushions and retards an upward movement of the head 16 and this cushioning effect in connection with the spring 25 is sufficient to thoroughly cushion and relieve considerable of the jar experienced when traveling in a vehicle over rough roads.

It is apparent that the tire 21 can be easily and quickly renewed when worn and a new tire replaced, and that the semi cylindrical sectional shell thoroughly protects the cylinders 6 and their appurtenant parts.

Having now described my invention, what I claim as new, is:—

1. The combination with a wheel having spokes, a felly, and a rim, said felly and rim between said spokes being provided with openings, cylinders arranged in said openings, caps carried by said cylinders and having ports formed therein for admitting air to said cylinders, pistons slidably mounted in said cylinders, a semi cylindrical sectional reinforced shell carried by said pistons, springs interposed between said shell and said cylinder, and a tire surrounding said shell and having the edges thereof secured to said rim, substantially as described.

2. The combination with a wheel rim, and a tire secured thereto, of a plurality of cylinders extending through the rim, nuts engaging said cylinders for securing the cylinders in position in the rim, caps on the outer ends of said cylinders each provided with a central aperture, pistons in said cylinders having their rods extending through the outer ends of the cylinders and through the caps on said outer ends of the cylinders, a sectional reinforced shell with said tire, said piston rods being connected one to each section of said shell, and springs arranged on the piston rods between the sections of said shell and the caps on the outer ends of said cylinders.

In testimony whereof I affix my signature in the presence of two witnesses.

JAMES G. MAXWELL.

Witnesses:
CHAS. A. ELY,
GEO. I. WILHELM.